Oct. 28, 1947.  W. A. CATALANO  2,429,707
SUPPLEMENTARY FUEL
Filed Aug. 16, 1946
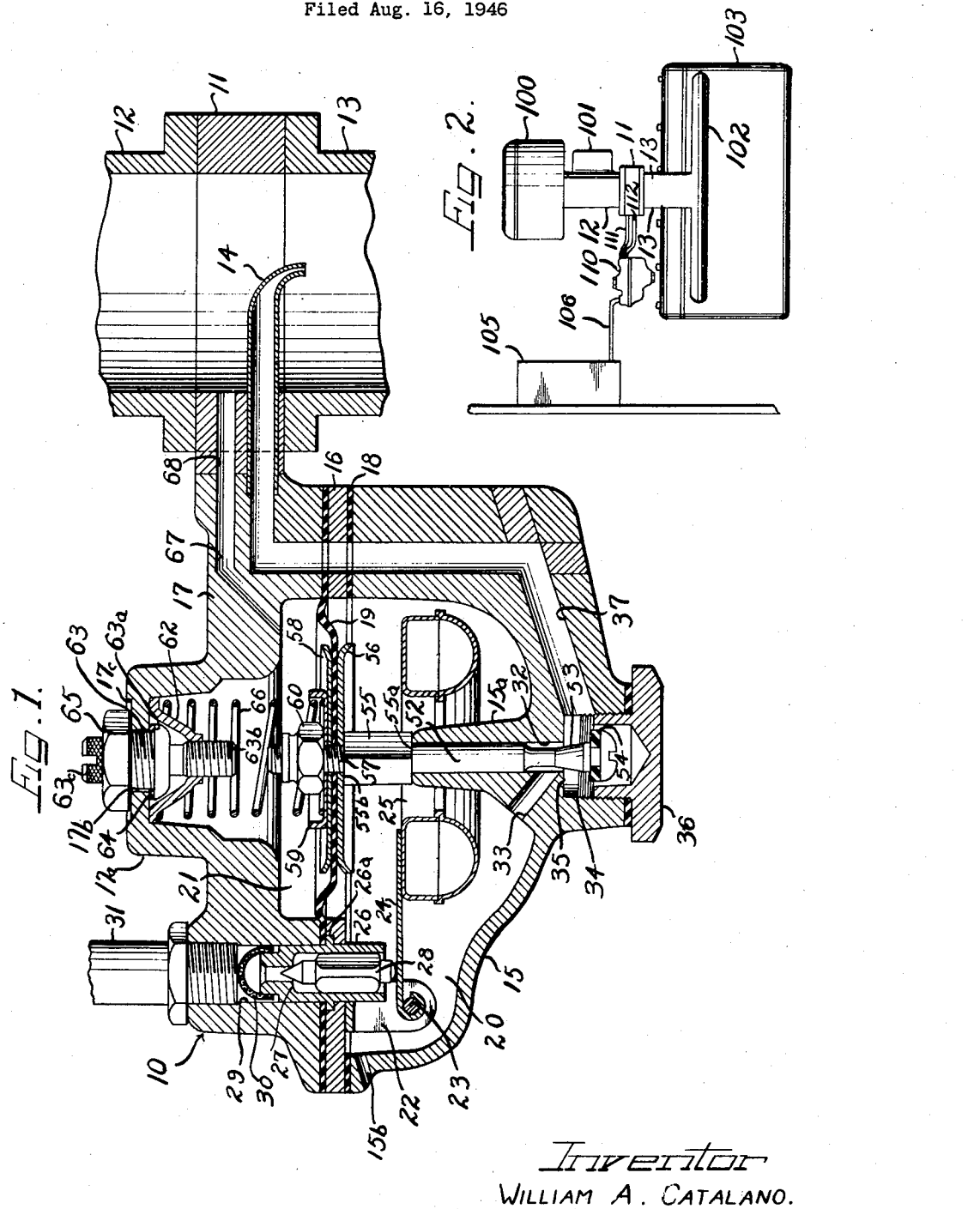
Inventor
WILLIAM A. CATALANO.
by Attys Patented Oct. 28, 1947

2,429,707

UNITED STATES PATENT OFFICE 2,429,707

SUPPLEMENTARY FUEL

William A. Catalano, University Heights, Ohio, assignor to Thompson Products, Inc., Cleveland, Ohio, a corporation of Ohio Application August 16, 1946, Serial No. 691,159

5 Claims. (Cl. 44—53)

This invention relates to a supplementary fuel for internal combustion engines comprising a mixture of water with the lower aliphatic alcohols such as methyl alcohol, ethyl alcohol, or isopropyl alcohol.

It has heretofore been proposed to feed auxiliary fuels such as the above mentioned supplementary fuel to internal combustion engines for the purpose of suppressing engine detonation and for increasing the power delivery of the engine. In view of the fact that most detonation-suppressing liquids, including water-alcohol mixtures, are immiscible with the main fuel, such as gasoline, it is desirable to feed a spray or jet of the supplementary fuel into the atomized gasoline for effecting intimate intermingling of the two materials. It is further desirable to filter or screen the supplementary fuel before the same is intermingled with the main fuel.

The peak knock point of each engine will vary somewhat and if expensive auxiliary fuels, such as alcohol-water mixtures, are to be used for suppressing engine detonation, it is most economical to feed these liquids only when actually needed, and then only in amounts that are just sufficient to carry out their function. For this reason, specially designed metering or feeding devices for such supplementary fuel have been provided, for instance, a feeding device for the auxiliary liquid actuated between open and closed position by the suction or vacuum in the main engine intake, which varies inversely with the engine speed and throttle opening. Such a device may take the form of a metering valve controlled by a diaphragm operated by said vacuum and by a spring.

It will thus be noted that supplementary fuels of the nature indicated are usually fed to an internal combustion engine by means of devices including a filter, a metering valve, and a jet orifice. An example of such a device is described in some detail hereinbelow.

I have found that even when distilled water is added to pure but not necessarily absolutely water free alcohols, such as methyl, ethyl or isopropyl alcohols containing less than 10% water, for the purpose of preparing an alcohol-water mixture suitable for use as an auxiliary or supplementary fuel, more or less slimy deposits or precipitates appear in the resulting mixtures within 24 hours. These deposits or precipitates form even when every possibility of corrosion is excluded, as by the use of glass vessels for compounding and storage of the water-alcohol mixtures. Further, on the use of such alcohol-water mixtures, deposits form on the filter, on the moving parts of the metering valve, and in the orifice, which interfere with the proper functioning of these devices. This precipitation or deposit formation apparently is due to some material present in the alcohol, for, as stated, the deposit or precipitate was formed on addition of carefully distilled and practically pure water to the alcohol under conditions excluding corrosion. On the other hand, the precipitates or deposits could not be due to any material known to be a contaminant for the ordinary alcohols, such as methyl alcohol, ethyl alcohol, and isopropyl alcohol, for the deposits or precipitates were formed even when I employed an alcohol that had been highly purified by conventional methods of purification and distillation.

I have now found, to my great surprise, that the formation of said precipitates or deposits are due to the presence, even in alcohol highly purified by conventional methods, of small amounts of calcareous material, probably alcohol soluble calcareous organic compounds like calcium alcoholates. These compounds are somewhat volatile, and, as far as I know, no conventional method of purifying the lower alcohols mentioned hereinabove provides for their separation or removal. The calcium alcoholates are probably formed, when alcohols are rectified by distillation, by reaction of the alcohol with calcium compounds present in the alcoholic material being distilled and derived, for instance, from vegetable material. Apparently the calcium alcoholates are decomposed when the above mentioned alcohol-water mixtures are allowed to stand, with the resultant formation of calcium hydroxide, or of calcium carbonate, or of some other calcareous composition, when exposed to such carbon dioxide as may be present in said alcohol-water mixture, or may be absorbed thereby from the air.

I have further found that the formation of said precipitates or deposits may be completely eliminated in supplementary fuel containing from 20 to 80% (preferably 50%) of water admixed with from 80 to 20% (preferably 50%) of methyl alcohol, ethyl alcohol, isopropyl alcohol, or other lower alcohols, by incorporating with said mixture a composition capable of reacting with calcium alcoholates to form calcium combinations soluble or dispersible in said alcohol-water mixture. Specific examples of such compositions to be incorporated with the alcohol-water mixtures are sulphonated vegetable and mineral oils. A composition consisting of from 80 to 84% of a neutral petroleum oil and from 16 to 20% petroleum sulphonate soap of the water soluble green acid type has been found quite satisfactory. Such oils may be added in amounts of from ¼ or ½ to 1% by volume of the supplementary fuel.

It is therefore an important object of the present invention to provide stable alcohol-water mixtures suitable for use as supplementary fuels in internal combustion engines.

Another important object of the invention is to provide a method of preventing the formation of precipitates in alcohol-water mixtures by addition thereto of acidic organic material, in particular, sulfonated vegetable or mineral oils.

Other and further objects and features of the invention will become apparent from the following description and appended claims.

In order to illustrate more fully the utilization of the supplementary fuel according to the present invention, I have described hereinbelow a method and apparatus for feeding the supplementary fuel into an internal combustion engine, reference being had to the accompanying drawings, in which:

Figure 1 is a diagrammatic, cross-sectional view, with parts shown in elevation, of a metering valve provided with a filtering device and a jet device for dispersing my supplementary fuel in the atomized air-gas mixture provided by a carburetor; and Figure 2 is a side elevation of an internal combustion engine-carburetor assembly including a device similar to that of Figure 1 and a tank for my supplementary fuel.

In Figure 1, the reference numeral 10 designates generally a supplementary feed device mounted on a mounting block 11 which is positioned between the outlet 12 of a carburetor and the inlet 13 of an engine intake manifold. The block 11 carries jet tube 14 with an outlet facing downstream in the block 11. The tube itself projects laterally through the block 11.

The device 10 includes a casing 15, a diaphragm plate 16, and a cover 17. A gasket 18 is provided between the plate 16 and the cover 17. The casing 15 defines a float chamber 20. The cover 17 defines a spring chamber 21. The chambers 20 and 21 are separated by a diaphragm 19.

A bracket 22 depends from the plate 16 into the float chamber 20. A pin 23 carried by the bracket 22 pivotally supports an arm 24 carrying an annular float 25. A tubular valve housing 26 extends through the plate 16 and has a flange 26a seated on the shoulder in the plate for supporting the housing. The housing 26 has a valve seat 27 intermediate the ends thereof.

The valve 28 is slidable in the housing and coacts with the seat 27 to control the flow of fluid through the housing into the float chamber 20. The arm 24 of the float assembly acts on the valve 28 to move the valve against its seat 27 whenever the float chamber is filled.

The float 25 thereby controls the valve 28 for admitting supplementary fuel to the float chamber 20.

The cover 17 has a passageway 29 receiving the upper portion of the valve housing 26 therein. A screen or other filter 30 is disposed in the passageway 29 over the top of the valve housing 26. A supply tube 31 for feeding an anti-detonant mixture of water and alcohol through the device 10 is coupled into the passageway 29 of the cover.

The casing 15 has an upstanding hollow boss portion 15a in the central part of the float chamber 20 thereof. This boss portion 15a extends into the center aperture of the annular float 25.

A passageway 32 is provided through the boss 15a and communicates with the float chamber through ports such as 33 in the bottom of the boss portion. A well 34 is provided in the bottom of the casing 15 and communicates with the passageway 32 to provide a valve seat 35 at the end of the passageway 32. The well 34 is internally threaded and a plug 36 is screwed into the well to close the bottom thereof. A conduit 37 extends from the well 34 laterally, then upwardly through casing 15, the plate 16 and the cover 17, and then laterally through the cover 17 into communication with the jet tube 14.

A metering valve 52 is slidably mounted in the passageway 32 of the boss portion 15a and has a tapered head 53 coacting with the valve seat 35 to provide a metering orifice outlet at the bottom of the passageway 32 joining the port 33 with the conduit 37. A sealing washer 54 is carried at the large lower end of the tapered valve head 53 to present a flat sealing face to the valve seat 35 for closing the orifice whenever the metering valve 52 is raised sufficiently to seat the sealing washer 54 on the seating face 35.

A head 55 is provided on the upper end of the valve assembly 52 above the boss portion 15a and provides a first shoulder 55a thrusting against the top of the boss 15a to determine the maximum opening of the metering orifice by controlling the lowermost position for the valve head 53. The head 55 provides a second shoulder 55b receiving a metal washer 56 thereon. A threaded shank 57 projects from the head 55 through the washer 56, through the central portion of the diaphragm 19, through a second washer 58, and through a spring retainer 59 into the spring chamber 21. A nut 60 is threaded on this portion 57 and is bottomed on the spring retainer 59 to clamp the diaphragm 19 between the washers 56 and 58.

The cover 17 has a dome portion 17a. A spring retainer 62 is disposed in the dome portion 17a. A screw member 63 fits freely in an aperture 17b formed through the top of the dome portion 17a of the cover 17. This screw member 63 has a shoulder 63a receiving a sealing washer 64 thereon for sealing engagement with the dome around the aperture 17b. A nut 65 is threaded on the screw member 63 exteriorly of the dome 17a and is bottomed in a recess 17c provided in the top of the dome around the aperture 17b thereof. The nut is tightened to draw the sealing member 64 into sealing engagement with the dome, thereby closing the aperture 17b.

The screw member 63 has a depending threaded portion 63b threaded through the spring retainer 62. A slotted head 63c is provided for the opposite end of the screw member 63. In order to shift the spring retainer 62, the nut 65 is loosened and the screw head 63 engaged by a rotating tool. Rotation of the screw member 63 will thereupon shift the spring retainer 62 along the axis of the screw member 63.

A coil spring 66 is maintained under compression between the retainers 59 and 62. This spring 66 has a group of closely spaced coils at the upper end thereof and a group of widely spaced coils at the lower end thereof. The pitch of the widely spaced coils is therefore much greater than the pitch of the closely spaced coils so that the latter coils will deflect under lighter loads than the former coils. The spring 66 thereby has a dual rate that requires only relatively light loads to initially compress it, but relatively heavy loads to compress it beyond the initial compression stage.

This dual rate spring thus allows movement of the retainer 59 toward the retainer 62 when subjected to a very light load, but, as the retainer 59 approaches the retainer 62, the spring stiffens and requires a materially higher load to permit further movement.

The spring chamber 21 is connected to the vacuum existing in the intake of the engine by means of a passageway or bore 67 in the cover 17 and a mating bore 68 in the block 11. This passageway thereby vents the spring chamber 21 to the vacuum existing in the engine intake. The float chamber 20 is vented to the atmosphere through an opening 15b in the upper part of the cover 15.

Vacuum in the spring chamber 21 draws the diaphragm 19 into the chamber, thereby shifting the metering valve assembly 52 against the action of the spring 66 and moving the metering valve head 53 into the passageway 32 for closing the metering orifice. When sufficient vacuum has been developed in the spring chamber 21, the sealing washer 54 will seat against the valve face 35 to seal the float chamber 20 from the passageway 37.

A general assembly of which the device of Figure 1 can form a part is illustrated in Figure 2 as including an air cleaner 100, a carburetor 101 discharging an atomized fuel-air mixture through the outlet 12, and through the block 11 into the inlet 13 of an intake manifold 102 for an engine 103. Supplementary fuel contained in a tank 105 is fed through tube 106 to a device identical with the device of Figure 1 except for the connection of the conduits 67 and 37 with the block 11, respectively, through tubes 111 and 112, instead of the direct connection shown in Figure 1.

In operation, the supplementary fuel is received by the device 10 through the tube 106. The float 25 controls the inlet valve 28 to admit the fuel to the float chamber 20 after filtration through the filter 30. The vent 15b connecting the float chamber 20 with the atmosphere maintains the float chamber under atmospheric pressure. Supplementary fuel under atmospheric pressure in the float chamber 20 is metered through the jet 14 by the tapered metering valve head 53. The size of the metering valve orifice is controlled by the degree of vacuum in the spring chamber 21 and by setting of the spring 66.

As vacuum builds up in the intake manifold, the spring chamber 21 becomes evacuated to act on the diaphragm 19 for urging the metering valve towards its closed position. The flow of supplementary fuel from the chamber 20 will thereupon be accurately metered by the valve head 53 and the rate of flow of the metered fuel to the jet 14 is thus controlled.

Since, as indicated hereinabove, the supplementary fuel need only be fed to the engine during those periods of operation when detonation occurs, and since such periods vary with each engine, with the quality of fuel being burned, and with the altitude level or barometric pressure of the atmosphere surrounding the engine, the above described device should be adjusted to meet the operating characteristics and these adjustments are readily made by controlling the spring setting through shifting of the retainer 62.

It will be noted that in the above described device the filter 30, the valve 28, the valve 53 and the orifice of the jet 14 can be fouled by deposits formed by or in the supplementary fuel passing through the device. I have found that such deposits invariably are formed even when mixtures of distilled water with alcohols highly purified by conventional methods are employed as a supplementary fuel. Since the feed device 10 as shown in Figure 1 is positioned closely adjacent the engine 103, fluid in the device and about to enter the device is heated by the engine to temperatures around 150 to 200° F. I have found that these elevated temperatures accelerate the slime formations. On the other hand, when I incorporate with the supplementary fuel a sulphonated vegetable or mineral oil such as the composition disclosed hereinabove containing petroleum sulfonate, or other composition capable of solubilizing or dispersing calcium alcoholates in mixtures of alcohol with water, no such deposits are formed, and the metering and dispersing device described hereinabove, or other similar devices, function efficiently over long periods of time.

It should be clearly understood that many features of composition and procedure may be varied within a wide range without sacrificing the advantages described hereinabove, and without departing from the principles of this invention, and it is, therefore, not my intention to limit the patent granted on this invention otherwise than necessitated by the scope of the appended claims.

I claim as my invention:

1. A supplementary fuel for an internal combustion engine consisting essentially of a mixture of from 20 to 80% water with from 80 to 20% of a lower aliphatic monohydric alcohol containing an alcohol soluble calcareous organic compound normally tending to form a precipitate in said fuel on standing thereof, said fuel further comprising from one-quarter to one per cent of a mineral oil containing water-soluble mineral oil sulphonates capable of acting on the calcium content of said calcareous organic compound to prevent said precipitation.

2. A supplementary fuel for an internal combustion engine consisting essentially of about 50% each of water and a lower monohydric aliphatic alcohol containing an alcohol soluble calcareous organic compound normally tending to form a precipitate in said fuel on standing thereof, said fuel further comprising from one-quarter to one per cent of a mineral oil containing water-soluble mineral oil sulphonates capable of acting on the calcium content of said calcareous organic compound to prevent said precipitation.

3. An internal combustion engine supplementary fuel capable of being stored and passed through a metering device at elevated temperatures of from 150 to 200° F. without the formation of precipitates and consisting essentially of from about 20 to 80% of ethyl alcohol containing an alcohol soluble calcareous organic compound normally tending upon standing to form a precipitate in said fuel, and from about 80 to 20% water and said fuel also containing from about ¼ to 1% of a composition consisting of neutral petroleum oil and petroleum sulphonate soap of the water-soluble green acid type.

4. An internal combustion engine supplementary fuel capable of being stored and passed through a metering device at elevated temperatures of from 150 to 200° F. without the formation of precipitates and consisting essentially of from about 20 to 80% of a lower monohydric alcohol containing an alcohol soluble calcareous organic compound normally tending upon standing to form a precipitate in said fuel and from about 80 to 20% of water, and said fuel also containing a relatively small amount of an oil containing a water-soluble sulphonated oil in the range of about ¼ to 1% of the fuel and reactable with the calcium of said calcareous organic compound to prevent formation of said precipitate.

5. An internal combustion engine supplementary fuel capable of being stored and passed through a metering device at elevated temperatures of from 150 to 200° F. without the formation of precipitates and consisting essentially of from about 20 to 80% of ethyl alcohol containing an alcohol soluble calcareous organic compound normally tending upon standing to form a precipitate in said fuel and from about 80 to 20% of water, and said fuel also containing a relatively small amount of an oil containing a water-soluble sulphonated oil in the range of about ¼ to 1% of the fuel and reactable with the calcium of said calcareous organic compound to prevent formation of said precipitate.

WILLIAM A. CATALANO.

REFERENCES CITED

The following references are of record in the file of this patent:

UNITED STATES PATENTS

| Number | Name | Date |
|---|---|---|
| 2,229,215 | Magruder et al. | Jan. 21, 1941 |
| 2,182,612 | Eaton | Dec. 5, 1939 |
| 1,878,468 | Covell | Sept. 20, 1932 |

FOREIGN PATENTS

| Number | Country | Date |
|---|---|---|
| 452,987 | Germany | Nov. 26, 1927 |